United States Patent
Kazmi (10) Patent No.: US 9,247,501 B2
(45) Date of Patent: Jan. 26, 2016

(54) METHOD AND ARRANGEMENT FOR HANDLING A RADIO RECEIVER IN A WIRELESS COMMUNICATION NETWORK

(75) Inventor: Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 692 days.

(21) Appl. No.: 12/812,780

(22) PCT Filed: Jan. 17, 2008

(86) PCT No.: PCT/SE2008/050052
§ 371 (c)(1),
(2), (4) Date: Mar. 3, 2011

(87) PCT Pub. No.: WO2009/091303
PCT Pub. Date: Jul. 23, 2009

(65) Prior Publication Data
US 2011/0211466 A1   Sep. 1, 2011

(51) Int. Cl.
*H04J 1/16* (2006.01)
*H04J 3/14* (2006.01)
*H04L 1/00* (2006.01)
*H04L 12/26* (2006.01)
*H04W 52/02* (2009.01)
*G08C 17/00* (2006.01)
*H04W 76/04* (2009.01)

(52) U.S. Cl.
CPC .......... *H04W 52/0261* (2013.01); *G08C 17/00* (2013.01); *H04L 1/00* (2013.01); *H04W 76/048* (2013.01)

(58) Field of Classification Search
USPC ................... 370/311, 252; 455/466; 320/135
See application file for complete search history.

(56) References Cited

U.S. PATENT DOCUMENTS

| | | | |
|---|---|---|---|
| 6,519,469 B1 * | 2/2003 | Rydnell et al. | 455/466 |
| 2005/0212490 A1 * | 9/2005 | Horii et al. | 320/135 |
| 2007/0064662 A1 | 3/2007 | Bultan et al. | |

(Continued)

FOREIGN PATENT DOCUMENTS

| | | |
|---|---|---|
| WO | 00/22837 A2 | 4/2000 |
| WO | 2004/003715 A1 | 1/2004 |
| WO | 2006037377 A1 | 4/2006 |

(Continued)

OTHER PUBLICATIONS

Swedish Patent Office, International Search Report in PCT/SE2008/050052, Nov. 24, 2008.

(Continued)

*Primary Examiner* — Helal A Algahaim
*Assistant Examiner* — Mahmoud Ismail
(74) *Attorney, Agent, or Firm* — Patent Portfolio Builders PLLC (57) ABSTRACT

The invention provides a mechanism that on an opportunistic basis, enables an increased performance of network related services in a user equipment without significantly increasing the user equipment's power consumption A method in a user equipment is provided for handling a radio receiver comprised in the user equipment The radio receiver is adapted to receive signals from a first network over a radio link The user equipment further comprises a battery The method comprises the steps of: —detecting a change of power consumption of the battery in the user equipment, and —adjusting the receiver activity level based on the detected change of battery power consumption.

27 Claims, 9 Drawing Sheets

(56) References Cited

U.S. PATENT DOCUMENTS

2007/0291673 A1* 12/2007 Demirhan et al. ............ 370/311
2008/0181127 A1   7/2008 Terry et al.

FOREIGN PATENT DOCUMENTS

WO    2007149732 A1   12/2007
WO    2008082347 A1   7/2008

OTHER PUBLICATIONS

Swedish Patent Office, International Preliminary Report on Patentability in PCT/SE2008/050052, Jan. 4, 2010.
Extended European Search Report issued in corresponding European application No. 08 705324, date of completion of the search May 11, 2015.

* cited by examiner

METHOD AND ARRANGEMENT FOR HANDLING A RADIO RECEIVER IN A WIRELESS COMMUNICATION NETWORK

TECHNICAL FIELD

The invention relates to a user equipment and a method therein. The invention further relates to a network node and a method therein. In particular it relates to adjusting the activity level in a receiver comprised in the user equipment.

BACKGROUND

In wireless communication systems such as Global System for Mobile communications (GSM), Wideband Code Division Multiple Access (WCDMA) and Long Term Evolution (LTE), discontinuous reception (DRX) allows the user equipment to save its battery consumption. The user equipment's battery life time is important for the network to ensure that its subscriber's don't have to recharge the battery unnecessarily and are able to access the network services whenever desired. The DRX cycle adjusts the user equipment's radio receiver activity depending on what kind of online service that is currently accessed. The DRX operation is employed not only in idle, or low activity states, but also in connected mode. In principle this allows the network to have considerable control on the overall user equipment power consumption in idle and connected modes.

In low activity states the DRX is used to save the user equipment battery power consumption. In such states the user equipment is able to receive paging or very short packets only at well-defined periodic instances depending upon the actual DRX state. The periodicity of the DRX operation is determined by the DRX cycle, which is set by the network. A typical DRX cycle may range e.g. from 0.1 second to 10 seconds. In both WCDMA and LTE the DRX cycle is user-specific, which means different users in the same cell are individually assigned a DRX cycle. It is initially assigned to the user equipment at the time of registration but later on it can be altered (shortened or extended) any time by the network. Furthermore, the DRX cycle can be assigned by the core network through non access stratum (NAS) procedures using higher layer protocol signalling.

In low activity states, the user equipment autonomously decides when and which cell to reselect. To some extent the user equipment mobility behaviour is controlled by some broadcasted system parameters and performance specification. The cell reselection in the user equipment relies on some downlink measurements. More specifically in order to be able to camp to the correct cell, e.g. best cell in terms of radio conditions, the user equipment regularly performs two important tasks: 1) identification of new neighbour cells, and 2) downlink measurements on the identified neighbour cells. The two tasks are carried out by the user equipment in parallel. Furthermore, the user equipment has to keep track of at least a certain number of cells, e.g. 8 in WCDMA, in terms of their identification and neighbour cell measurements.

In low activity states the user equipment performs cell identification and neighbour cell measurements during the paging occasions or the so-called wake up instances, i.e. the time during which the user equipment wakes up to listen to the expected paging or other relevant information. Generally the wake up instances are very short. e.g. less than 1 ms. This has direct impact on the measurement performance since user equipment is unable to collect sufficient number of measurement samples during a certain time period. More specifically the following aspects of the measurement performance are affected: 1) cell identification delay is extended (e.g. up to several seconds), 2) measurement accuracy of the measurement quantities become worse, 3) physical layer measurement period of the measurement quantities over which desired measurement accuracy is defined. The user equipment is not mandated to wake up only at the paging occasions. However, in practical implementation the user equipment will avoid switching on its receiver as much as possible during the sleep period. In very long DRX cycles (e.g. 5 seconds) the user equipment may wake up few times in between the paging occasions to perform measurements to make sure at least some minimum measurement quality is maintained. The last two aspects (accuracy and measurement period) could be traded to some extent, i.e. shorter measurement period with relatively worse accuracy and vice versa. In e.g. WCDMA all the above measurement performance aspects are worse than those achievable in active or connected mode, where much more intense measurement sampling rate is possible.

On paging reception or arrival of data the user equipment is required to change its state from idle or low activity to higher activity state or directly from idle to the active state. Obviously longer DRX cycle will lead to longer transition from idle to higher activity state, or in other words longer delay in accessing the incoming call or data. For conventional services like speech and classical packet data, the delay may not have severe impact. However, for some advanced services like online gaming the transition should be as fast as possible.

In WCDMA, DRX in active or the so-called Radio Resource Control (RRC) connected mode allows a user equipment to save its battery while staying connected since it wakes up only at periodic instances according to the DRX cycle. The DRX operation in active mode is also employed in LTE. The basic configuration of the DRX cycle and associated parameters is done via RRC signalling in both LTE and WCDMA. But still to some extent the DRX operation is controlled via lower layer signalling directly between the base station and the user equipment. This allows the network to promptly activate and deactivate the DRX operation.

In active or connected mode, the user equipment has to perform measurements to enable handovers. As in case of idle mode the user equipment regularly performs the following two major tasks in active mode: 1) Identification of new neighbouring cells, and 2) downlink measurements on the identified neighbour cells.

The DRX feature implies that the user equipment will mostly collect measurement samples at the wake up instances. Accordingly the measurement requirements in WCDMA have been relaxed in DRX mode. This means there will be much longer cell identification and measurement reporting delay in DRX. For instance the measuring reporting delay will be extended from 200 ms (in continuous reception mode) to around 5-6 seconds in WCDMA in the worst possible DRX scenario, i.e. user equipment only wakes up at the end of the longest possible DRX. The handover should not be delayed to avoid loss of data. Thus the impact on the mobility in active mode is more severe in the idle mode.

One difference between idle and active modes is that in the latter case generally much shorter DRX cycles are used. In LTE the DRX cycle in the order of up to 1 second is envisaged. Nevertheless, the delay in accessing the service compared to the continuous reception scenario is unavoidable. For some services like gaming and voice over IP the delay should be minimized. Another issue is that, due to DRX and especially in case of longer DRX, the network may not be able to fully exploit the characteristics of channel dependent scheduling. This may cause some throughput degradation compared to the continuous reception scenario.

In the past the main objective of the user equipment was to access voice and later on data services, which are offered by the network operator to its subscribers. These services will be referred to as online services. Traditional cell phones and even presently the low end user equipments are designed mainly to access online services. However the present and especially the future user equipments are incorporating at least two major evolutionary set of features: 1) offline, i.e. local services and 2) multiple set of online service technologies on the same terminal. Cell phone technology has dramatically evolved in terms of providing local services and features whose existence on a particular user equipment and accessed by the subscriber remain transparent to the operator because they are accessed without network's intervention. Well known examples of local services are music such as e.g. MP3-players, digital cameras, radio, word processors, advanced calculators, offline games, etc. The traditional conception of a user equipment is being transformed to a full scale computer. Common categories of user equipments are personal digital assistants, smartphones, pocket-computers, palm computers, etc. Another major step is that the same user equipment could support multiple technologies. Typical examples are combination of:

- TDD/FDD (Time Division Duplex/Frequency Division Duplex) WCDMA for unicast services and DVB-H for broadcast services
- TDD/FDD WCDMA for unicast services and FDD/TDD MBSFN (on different carriers)
- TDD/FDD LTE for unicast/broadcast and DVB-H for broadcast services Firstly it is not likely that all operators offer services related to all categories and combination of technologies. Secondly, even if an operator offers several of these services, it may still not be possible for each individual network (especially the lower protocol layers) to be aware of subscriber's activity and usage of other possible technologies, which are available on its user equipment. Additionally a subscriber due to economic or any other reason may choose not to access all set of services from the same service provider. Lastly the subscriber could access the services offered by different technologies independently.

The advanced user equipment bearing multiple local services and technologies are expensive. Therefore subscribers would expect overall better overall performance from all aspects, e.g. mobility, local services, etc. Further, the subscriber is likely to use its user equipment for multiple tasks on a more regular basis. This approach but will drain user equipment battery due to its frequent activation. It is also likely that subscriber uses the local features more often when moving around rather than when staying at home. For instance the user may prefer to use the user equipment to play music or take photos when driving a car or during a casual stroll, but instead prefer to use the standalone music players or cameras for example when attending a party. Evidently during mobility the level of accuracy and delays associated with the synchronization, measurements, etc, performed by the user equipment become critical.

In WO 00/22837 a variable sleep mode for mobile stations is presented where the sleep cycle of the mobile station may be optimally varied depending on one or more conditions relating to the mobile station's operation. In WO 00/22837 an improved service quality/delay leads to increased battery consumption. The variable sleep mode capabilities in WO 00/22837 permits optimization of the tradeoff between battery consumption and service quality/delay in accordance with the individual objectives and/or conditions of a particular user/mobile station.

SUMMARY

The objective problem of the present invention is to provide a mechanism that, on an opportunistic basis, enables an increased performance of network related services in a user equipment without significantly increasing the user equipment's power consumption.

In accordance with a first aspect of the present invention, the problem is solved by a method in a user equipment for handling a radio receiver comprised in the user equipment. The radio receiver is adapted to receive signals from a first network over a radio link. The user equipment further comprises a battery. The method comprises the steps of:

- detecting a change of power consumption of the battery in the user equipment, and
- adjusting the receiver activity level based on the detected change of battery power consumption.

In accordance with a second aspect of the present invention, the problem is solved by a method in a network node comprised in a network for handling a radio receiver in a user equipment. The network node and the user equipment are comprised in a wireless communication network. The method comprises the steps of:

- associating a first specific power consumption of a battery in the user equipment to a first receiver activity level, and
- sending information about the first specific power consumption of a battery associated to the first receiver activity level of the user equipment.

In accordance with a third aspect of the present invention, the problem is solved by a user equipment comprising a radio receiver. The radio receiver is adapted to receive signals from a network node comprised in a first network over a radio link. The user equipment comprises:

- a detector arranged to detect a change of power consumption of the battery in the user equipment, and
- an adjustor arranged to adjust the receiver activity level based on the detected change of battery power consumption.

In accordance with a fourth aspect of the present invention, the problem is solved by a network node arranged to handle a radio receiver in a user equipment. The network node and the user equipment are comprised in a wireless communication network. The network node comprises:

- an associating unit arranged to associate a first specific power consumption of a battery in the user equipment to a first receiver activity level, and
- a sending unit arranged to send information to the user equipment about the first specific power consumption of a battery being associated to the first receiver activity level.

By detecting an increase in battery power consumption, the user equipment can use this opportunity to increase the radio receiver reception activity by adjusting it to the new battery power consumption. This enables the user equipment to improve the performance of network related services without significantly increasing the battery power consumption of the user equipment.

DETAILED DESCRIPTION

Figure 1:
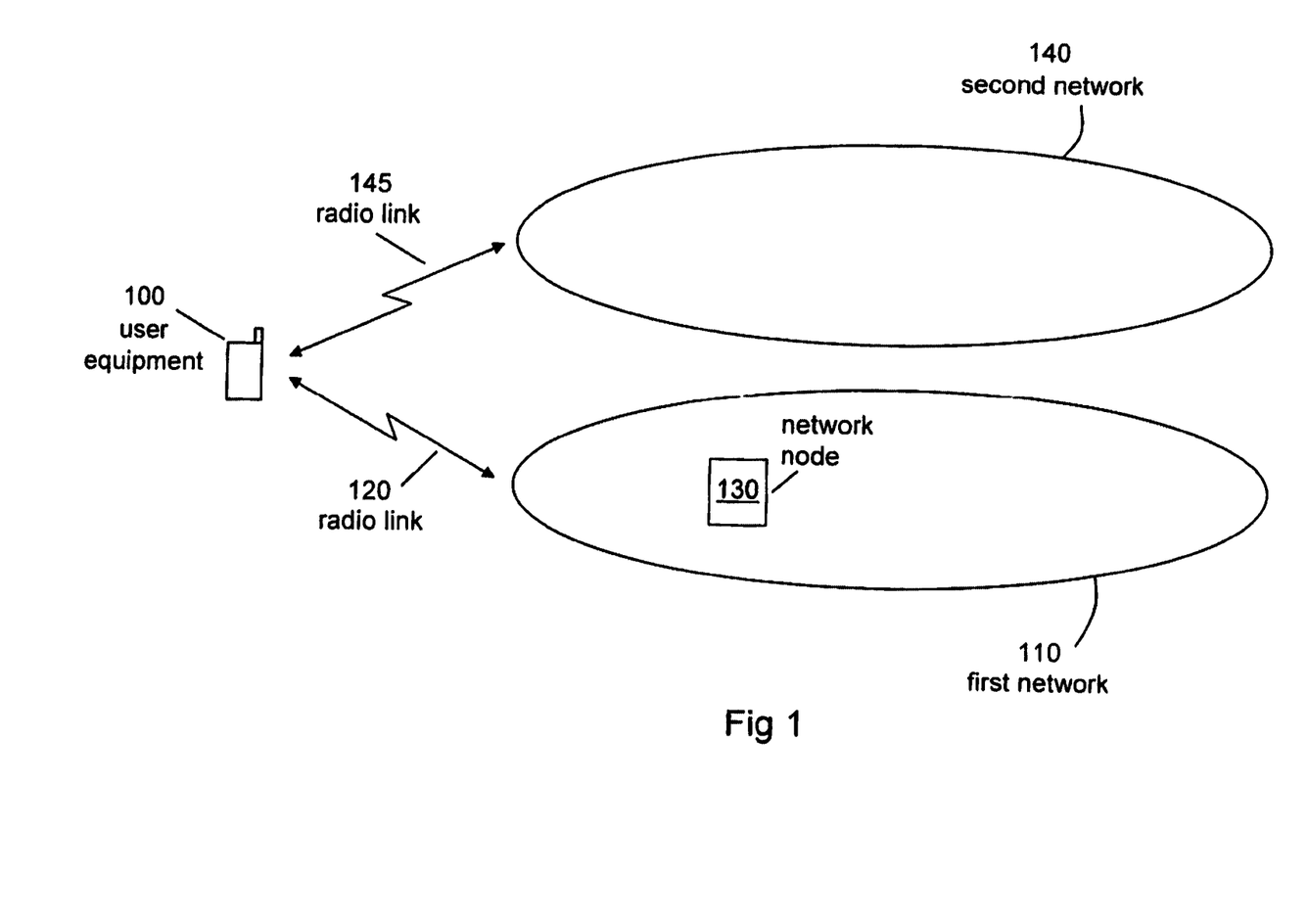
FIG. 1 is a block diagram illustrating embodiments of a wireless communication network.

FIG. 1 shows a user equipment 100 adapted to receive signals from a first network 110 over a radio link 120. The user equipment 100 may e.g. be a personal digital assistant, a smartphone, a pocket-computer, a palm computer, etc. The first network 110 comprises a network node 130. The network node 130 may e.g. be a SGSN server, a base station, radio network controller, base station controller, access gateway etc. The network node 130 is adapted to control activities in a radio receiver comprised in a user equipment 100. The network node 130 in the first network 110 is further arranged to receive signals from the second network 140. The user equipment 100 may further be adapted to receive signals from a second network 140 over a radio link 145. The first network 110 and the second network 140 may e.g. be a GSM network, a WCDMA network or an LTE network. The user equipment comprises a radio receiver, the radio receiver is adapted to adjust the receiver activity level to e.g. save the battery. The user equipment 100 further comprises at least one local service, e.g. a music player, a digital camera, a radio, an offline game, etc. The user equipment 100 is adapted to use at least one online service, such as speech, video streaming, internet access, mobile television, etc, provided by any of the first network 110 and/or second network 140. The user equipment 100 is further arranged to adjust the activity level of the radio receiver. The network node 130 may be arranged to associate a first specific battery power consumption in the user equipment 100 to a first activity level of the radio receiver, and a second specific battery power consumption in the user equipment 100 to a second activity level of the radio receiver. The network node 130 in the first network 110 may be further adapted to adjust from a first to a second activity level of the radio receiver.

Figure 2:
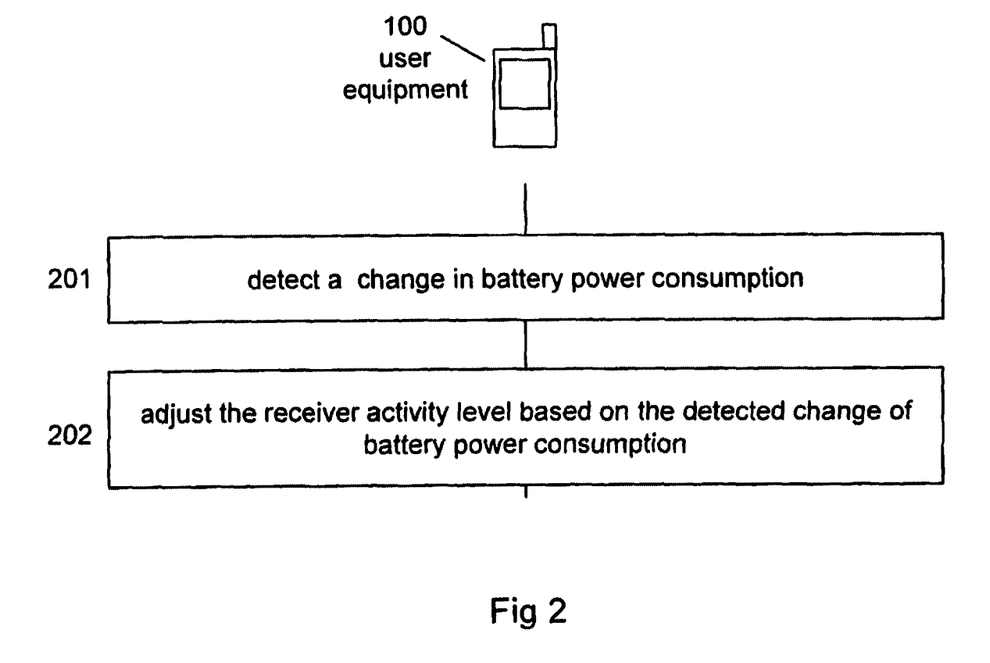
FIG. 2 is a flowchart illustrating embodiments of method steps.

A method for handling a radio receiver comprised in the user equipment 100, according to some general embodiments, is depicted in FIG. 2. In this scenario the user equipment 100 adjusts the activity level of the radio receiver in the user equipment 100 without any involvement or knowledge by the first network 110. The method comprises the following steps:

201. In this step, the user equipment 100 detects a change of battery power consumption. When a user starts using a first local service in the user equipment 100, the usage may cause the user equipment's battery power consumption to increase. The user equipment 100 may e.g. detect the increase by detecting when the change of battery power consumption exceeds a predetermined threshold value.

202. As a response to the increased battery power consumption caused by the use of the local service in step 201, the user equipment 100 may use this opportunity to autonomously adjust the activity level of the radio receiver. The increased activity gives the user equipment 100 an opportunity to improve the performance of e.g. 1) cell synchronization or re-synchronization, 2) downlink measurements on the serving and neighbouring cells, and/or 3) Doppler estimation without consuming any, or very little, extra power form the user equipment 100 battery. The above three actions may be performed without involving the first network 110 and has a positive effect on the quality of network related services in terms of e.g. prevent losing paging in idle mode, prevent losing data in active mode, and decrease of transition time from idle to active mode, decrease in cell reselection delay, decrease in handover delay, decrease in cell search delay, decrease in handover failures etc.

Figure 3:
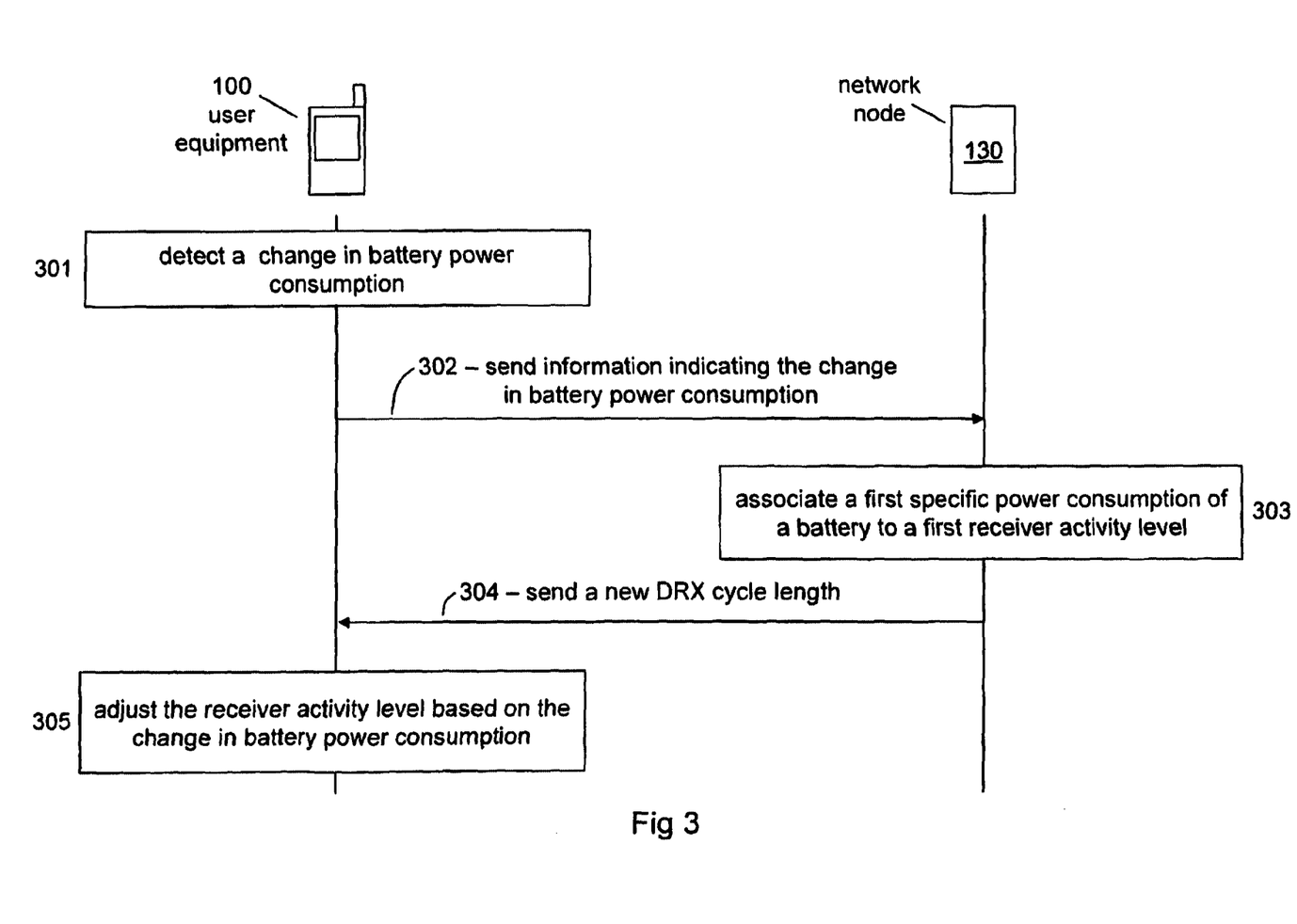
FIG. 3 is a combined flowchart and signalling diagram illustrating embodiments of method steps and exchange of signals.

A method in other embodiments for handling a radio receiver comprised in the user equipment 100 is depicted in FIG. 3. In this scenario the user equipment 100 adjusts the activity level of the radio receiver by involving the network node 130. The receiver activity level is in this example represented by a DRX cycle length which is assigned to the user equipment 100 by the network node 130. The method comprises the following steps:

301. In this step, the user equipment 100 detects a change of battery power consumption. E.g. when a user starts using a first local service in the user equipment 100, the usage causes the user equipment's battery power consumption to increase. In some embodiments the user equipment 100 detects the increase by detecting when the change of battery power consumption exceeds a predetermined threshold value.

302. As a response of the increased battery power consumption caused by the use of the local service in step 301, the user equipment 100 may send a message to the network node 130. The message comprises the current battery power consumption of the user equipment 100 and indicates that the activity of the radio receiver in the user equipment 100 may be increased accordingly.

303. The network node 130 receives the message from the user equipment 100. The message notifies the network node 130 that the battery power consumption in the user equipment 100 has been changed, and that the activity of the user equipment's radio receiver may be increased accordingly. In this step, the network node 130 associates a first specific power consumption of a battery in a user equipment 100 to a first receiver activity level. This may e.g. be performed by determining to adjust the DRX cycle length being associated to the user equipment's changed battery power consumption.

304. In this step, the network node 130 sends a message to the user equipment 100 comprising the adjusted DRX cycle length to be used, i.e. the message further comprises an instruction to change the activity level of the user equipment's radio receiver by using the adjusted DRX cycle.

305. The user equipment 100 adjusts activity level of the radio receiver and starts to use the adjusted DRX cycle length. If e.g. the activity of the radio receiver is increased, it gives the user equipment 100 an opportunity to improve the performance of e.g. 1) cell synchronization or re-synchronization, 2) downlink measurements on the serving and neighbouring cells, 3) Doppler estimation, and/or 4) online services without consuming any, or very little, extra power from the user equipment's battery. The above four actions have a positive effect of the quality of network related services in terms of e.g. prevent losing paging in idle mode, prevent losing data in active mode, and decrease of transition time from idle to active mode, decrease in cell reselection delay, decrease in handover delay, decrease in cell search delay, decrease in handover failures, etc.

Figure 4:
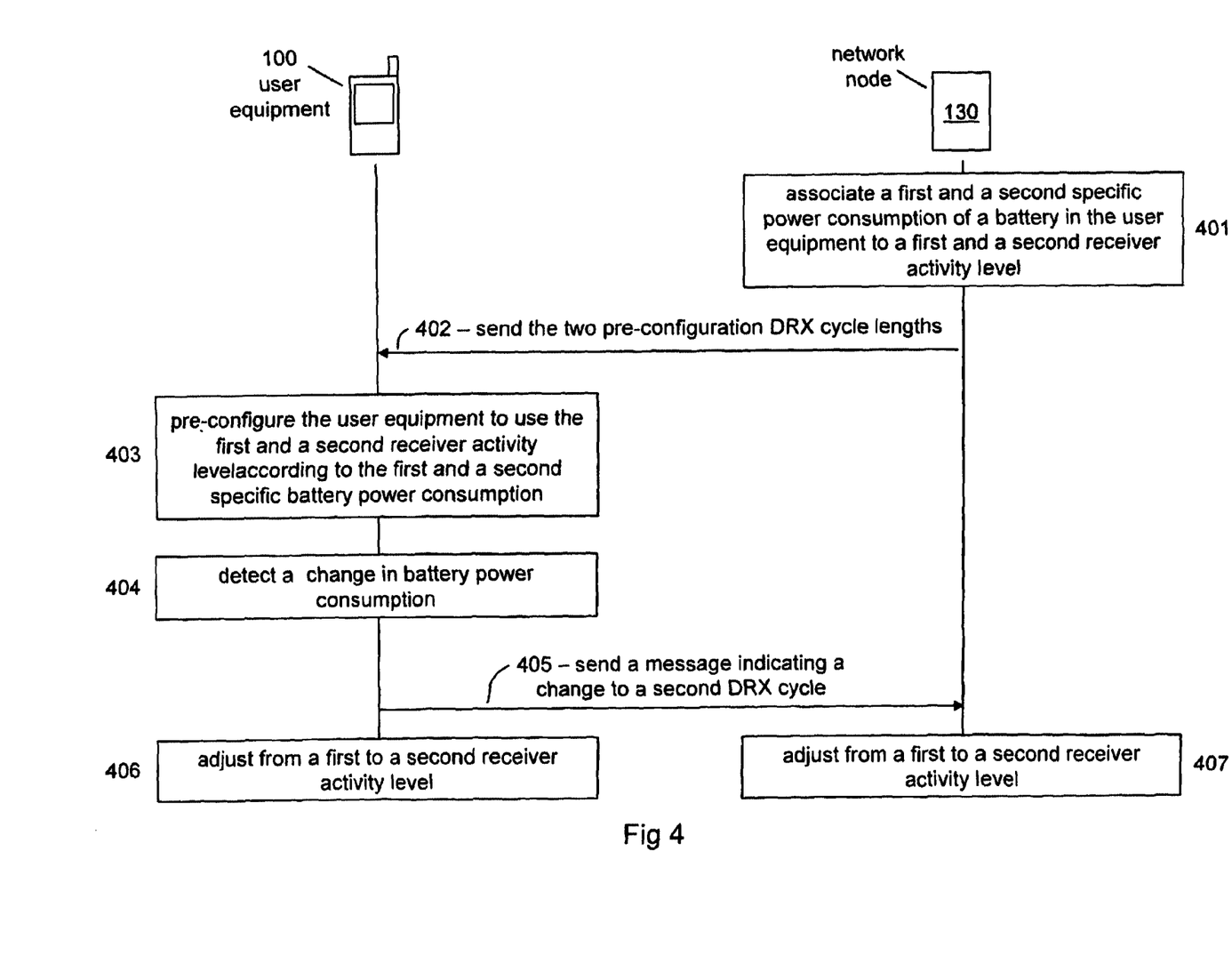
FIG. 4 is a combined flowchart and signalling diagram illustrating embodiments of method steps and exchange of signals.

A method according to some other embodiments for handling a radio receiver comprised in the user equipment 100 is depicted in FIG. 4. In this scenario the user equipment 100 adjusts the activity level of the radio receiver by adjusting from a first to a second preconfigured receiver activity level. The first receiver activity level is in this example represented by a first pre-configured DRX cycle length and the second receiver activity level is in this example represented by a second pre-configured DRX cycle length. The first and second DRX cycle lengths may be assigned to the user equipment 100 by the network node 130. The method comprises the following steps:

401. In this step, the network node 130 associates a first specific battery power consumption in the user equipment 100 to a first receiver activity level and a second specific battery power consumption in the user equipment 100 to a second receiver activity level. The first and second receiver activity level is represented by a respective first and a second DRX cycle length.

402. The network node 130 sends a message comprising the first and the second DRX cycle lengths to the user equipment 100 along with an instruction to use the first DRX cycle length associated to the first specific battery power consumption and the second DRX cycle length associated to the second specific battery power consumption.

403. When receiving the message, the user equipment 100 is configured to adjust to the first DRX cycle length when using the first specific battery power consumption and adjust to the second DRX cycle length when using the second specific battery power consumption.

404. When e.g. a user starts using a first local service in the user equipment 100, the usage causes a change from a first to a second battery power consumption in the user equipment 100. In this step, the user equipment 100 detects said change of battery power consumption. This may be performed by detecting that the change of battery power consumption exceeds a predetermined threshold value.

405. The user equipment 100 sends a message to the network node 130 indicating the change of battery power consumption. The user equipment 100 notifies the network node 130 that it is going to adjust from the first to the second preconfigured DRX cycle length.

406. After sending a message to the network node 130 the user equipment 100 may wait e.g. a determined period of time and then adjust the receiver activity level by switching from the first to the second pre-configured DRX cycle length. By waiting a determined period of time, the user equipment 100 allows the network node 130 and the user equipment 100 to adapt to the second DRX cycle length at the same point in time.

407. The network node 130 receives the message from the user equipment 100 indicating that the user equipment 100 is going to change from the first to the second DRX cycle length at a specific point in time due to increased battery power consumption. The network node 130 then adjusts by switching from the first to the second DRX cycle length preferably at the same point in time as the user equipment 100 adjusts to the second DRX cycle length without the need of sending any signals to the user equipment 100. If the second DRX cycle length is shorter than the first DRX cycle length, it results in an increased activity of the radio receiver in the user equipment 100. An increased activity of the radio receiver gives the user equipment 100 an opportunity to improve the performance of e.g. 1) cell synchronization or re-synchronization, 2) downlink measurements on the serving and neighbouring cells, 3) Doppler estimation, and/or 4) online services without consuming any, or very little, extra power from the user equipment's battery. The above four actions have a positive effect of the quality of network related services in terms of e.g. prevent losing paging in idle mode, prevent losing data in active mode, and decrease of transition time from idle to active mode, decrease in cell reselection delay, decrease in handover delay, decrease in cell search delay, decrease in handover failures etc.

Figure 5:
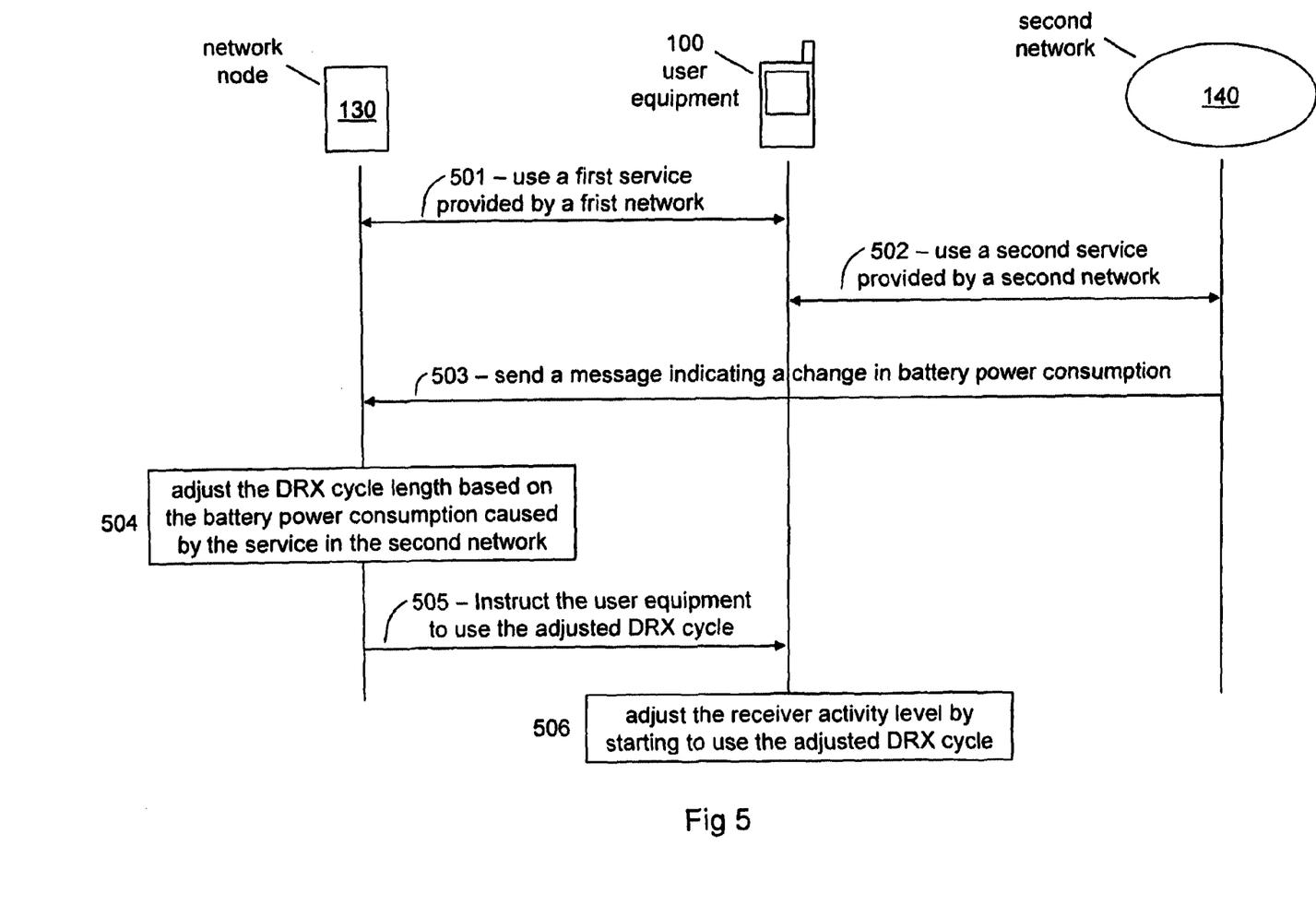
FIG. 5 is a combined flowchart and signalling diagram illustrating embodiments of method steps and exchange of signals.

A method according to some other embodiments for handling a radio receiver comprised in the user equipment 100 is depicted in FIG. 5. In this scenario the user equipment 100 improves the performance of network related services by adjusting from a first to a second activity level of the radio receiver. The receiver activity level is represented by a DRX cycle length which is assigned to the user equipment 100 by a network node 130 comprised in a first network 110. The DRX cycle length is based on the user equipment's battery power consumption caused by use of an online service provided to the user equipment 100 by a second network 140. The method comprises the following steps:

501. In this step the user equipment 100 is connected to a network node 130 in a first network 110 using a first online service, e.g. a WCDMA unicast service such as voice, internet access, video streaming, online gaming, positioning information, etc.

502. While the user equipment 100 is using the first service, the user equipment 100 also requests to utilize a second online service from a second network 140, e.g. a DVB-H service. Thus, the user equipment 100 now uses two independent online services, e.g. DVB-H (i.e. broadcast service) and unicast (e.g. speech, internet access, email etc), provided on different carriers over two different networks. The networks may be run by the same or different service providers. Another example is that of MBSFN and unicast on two different networks.

503. As the user equipment 100 starts utilizing the second service, the second network 140 sends a message to the network node 130. The message indicates the use of the second service which is causing a change of the user equipment's battery power consumption.

504. The network node 130 receives the message from the second network 140. The message notifies the network node 130 that the battery power consumption in the user equipment 100 has changed due to the use of the second online service, and that the activity of the user equipment's radio receiver may be adjusted accordingly. The network node 130 determines to use a DRX cycle length that is adjusted to the changed battery power consumption of the user equipment 100.

505. In this step, the network node 130 sends a message to the user equipment 100 comprising the determined DRX cycle length. The message further comprises an instruction to adjust the activity of the user equipment's radio receiver by using the determined DRX cycle.

506. In this step, the user equipment 100 receives the message from the network node 130 comprising the determined DRX cycle length and the instruction to change the activity of the radio receiver. The user equipment 100 adjusts the activity level of the radio receiver by starting to use the determined DRX cycle length. If e.g. the determined DRX cycle length involves a shorter DRX cycle length, the activity of the radio receiver is increased and gives the user equipment 100 an opportunity to improve the performance of e.g. 1) cell synchronization or re-synchronization, 2) downlink measurements on the serving and neighbouring cells, 3) Doppler estimation, and/or 4) online services without consuming any, or very little, extra power from the user equipment's battery. The above four actions have a positive effect of the quality of network related services in terms of e.g. prevent losing paging in idle mode, prevent losing data in active mode, and decrease of transition time from idle to active mode, decrease in cell reselection delay, decrease in handover delay, decrease in cell search delay, decrease in handover failures etc.

Figure 6:
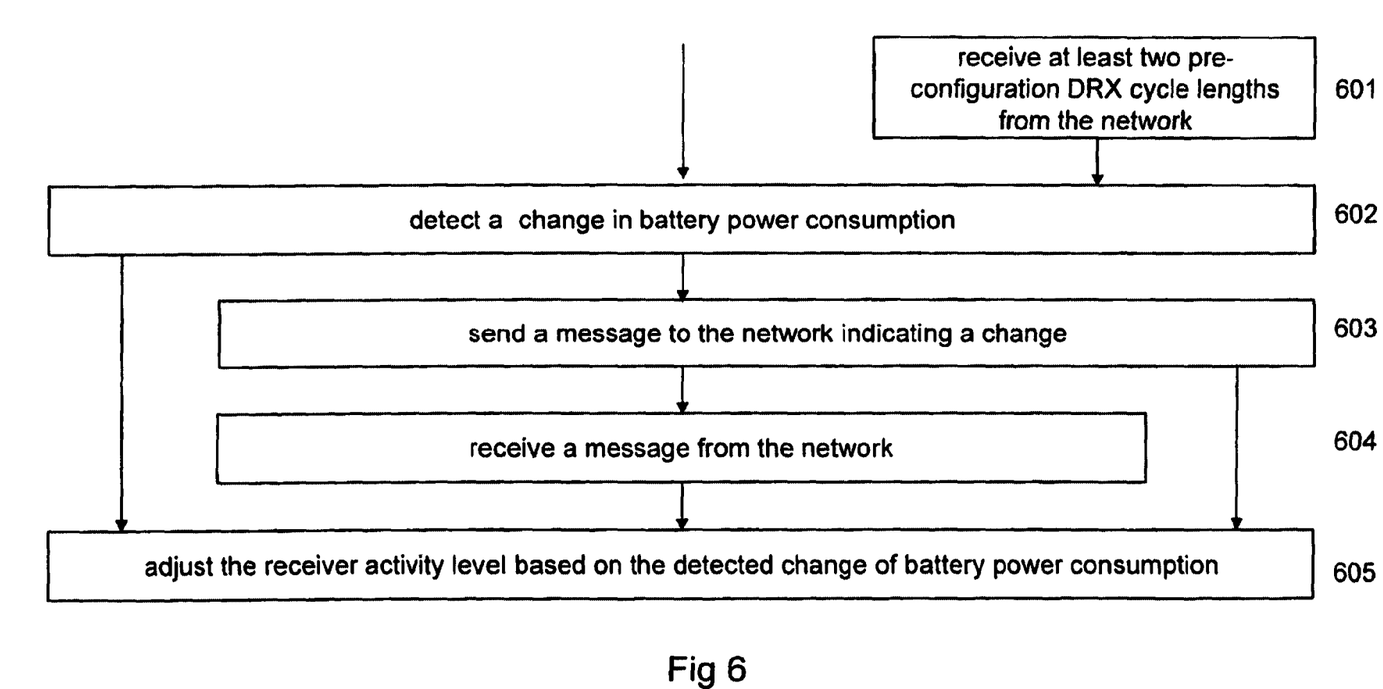
FIG. 6 is a flowchart illustrating embodiments of method steps in a user equipment.

The method steps in the user equipment 100 for handling the radio receiver comprised in the user equipment 100 will now be described with reference to a flow chart depicted in FIG. 6. In some embodiments any of the method steps in this method may be performed by an operating system comprised in the user equipment 100. The method comprises the steps of:

601. According to some embodiments, the user equipment 100 may in this step receive at least two pre-configuration DRX cycle lengths from the network node 130 comprised in the first network 110. The at least two pre-configuration DRX cycle lengths comprises a first pre-configuration DRX cycle length and a second pre-configuration DRX cycle length.

602. The user equipment 100 detects a change of battery power consumption in the user equipment 100.

In some embodiments the user equipment 100 may detect a change in battery power consumption when the change of battery power consumption exceeds a predetermined threshold value.

In some embodiments, wherein the user equipment 100 is arranged to perform a local service, the user equipment 100 performs this step by detecting a change in activity of the local service.

603. In some embodiments the user equipment 100 may send a message to the network node 130 comprising information indicating a change.

In some embodiments the information regards the change of battery power consumption. The message may also comprise a suggested DRX cycle length determined by the user equipment 100.

In the embodiments wherein step 601 has been performed, the information regards a request to change from the first DRX cycle length to the second DRX cycle length based on the change of battery power consumption.

In some embodiments the user equipment 100 may send the message to the network node 130 by awaiting an uplink transmission.

604. In some embodiments the user equipment 100 may receive a message from the network node 130.

The message may e.g. comprise an adjusted DRX cycle length from the network node 130 based on the information provided by the user equipment 100 in step 603.

In some embodiments, wherein a request has been sent in step 603, the message may comprise an accept of said request and an instruction to switch from the first pre-configuration DRX cycle length to the second DRX pre-configuration DRX cycle length.

In some embodiments, wherein a request has been sent in step 603, the message may comprise a rejection of said request.

605. This step may in some embodiments be performed directly after performing step 602. The user equipment 100 adjusts the activity level of the radio receiver based on the detected change of battery power consumption.

The user equipment 100 may adjust the receiver activity level based on the modified DRX cycle length received by the network node 130 performed in step 604.

In another embodiment, the user equipment 100 may adjust the receiver activity level by switching to one of the at least two pre-configured DRX cycle lengths received from the network node 130 in step 601.

In some embodiments, the detected change of battery power consumption of the user equipment 100 performed in step 602 may be represented by a decrease of battery power consumption. In these embodiments the step adjusting the receiver activity level results in an increase of said DRX cycle length.

In some embodiments of the invention, the detected change of battery power consumption of the user equipment 100 performed in step 602 may be represented by an increase of battery power consumption. In these embodiments the step of adjusting the receiver activity level results in a decrease of said DRX cycle length.

Figure 7:
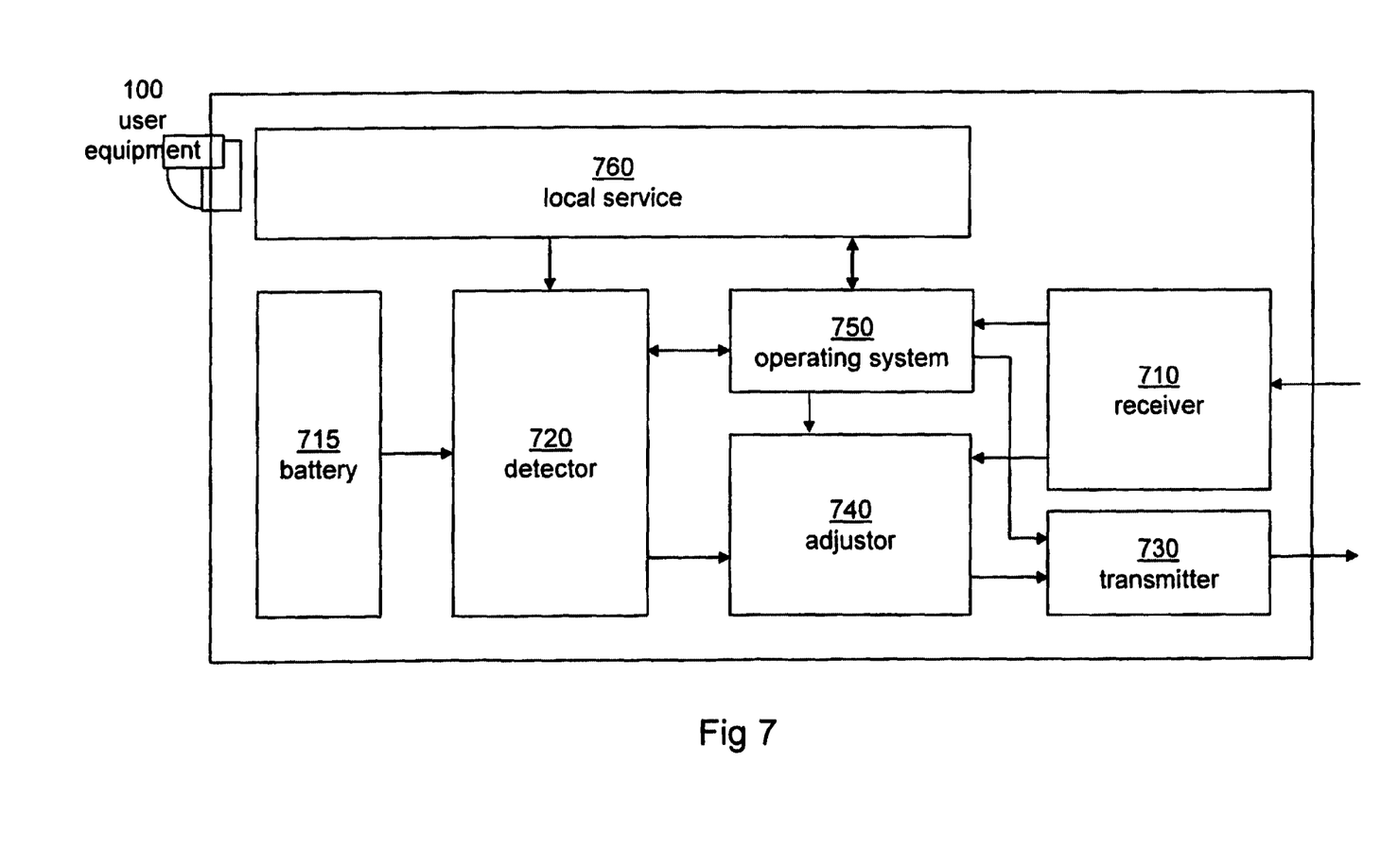
FIG. 7 is a block diagram illustrating embodiments of a user equipment.

The user equipment 100 arranged to perform the method steps of handling a radio receiver 710 in a user equipment 100 will now be described according to FIG. 7.

The user equipment 100 comprises the radio receiver 710. The radio receiver 710 is adapted to receive signals from a first network 110 over a radio link 120. The radio receiver 710 is arranged to adjust its activity level to save battery consumption of a battery 715 in the user equipment 100.

In some embodiments the radio receiver 710 is adapted to receive signals from a second network 140 over a radio link 145.

The radio receiver 710 may further be adapted to receive at least two pre-configuration DRX cycle lengths from the network node 130. The at least two pre-configuration DRX cycle lengths may comprise a first pre-configuration DRX cycle length and a second pre-configuration DRX cycle length.

In some embodiments the radio receiver 710 is further adapted to receive an adjusted DRX cycle length from the network node 130 based on the information provided by the user equipment 100 about the battery power consumption.

In some embodiments the radio receiver 710 is further adapted to receive an accept message from the network node 130 comprising an instruction to switch from a first pre-configuration DRX cycle length to the second DRX pre-configuration DRX cycle length.

The radio receiver 710 may further be adapted to receive a message from the network node 130 comprising a rejection of the requested switch from a first DRX cycle length to a second DRX cycle length.

The user equipment 100 further comprises a detector 720 arranged to detect a change of battery power consumption in the user equipment 100.

In some embodiments the detector 720 may detect a change in battery consumption when the change in battery power consumption exceeds a predetermined threshold value.

The detector 720 may be arranged to detect a change in battery power consumption by detecting a change in activity of a local service.

In some embodiments the detector 720 further is adapted to detect a change of battery power consumption represented by a decrease, or by an increase.

The user equipment 100 further comprises a transmitter 730. The transmitter 730 is arranged to send a message to the network node 130 comprising information indicating a change of battery power consumption.

In some embodiments the transmitter 730 is further adapted to send a message to the network node 130 indicating a change of DRX cycle length based on the detected change of battery power consumption. In these embodiments the message may further comprise a suggested DRX cycle length determined by the user equipment 100.

The transmitter 730 may be adapted to send a message to the network node 130 by awaiting an uplink transmission.

The user equipment 100 further comprises an adjustor 740. The adjustor 740 is arranged to adjust the activity level of the radio receiver 710 based on the detected change of battery power consumption.

The adjustor 740 is further adapted to adjust the receiver activity level based on an adjusted DRX cycle length.

In some embodiments the adjustor 740 further is adapted to adjust the receiver activity level by switching to one of at least two pre-configured DRX cycle length received from the network node 130.

The adjustor 740 may further be adapted to adjust the receiver activity level resulting in an increase or decrease of said DRX cycle length.

In some embodiments the user equipment 100 further comprises an operating system 750. The operating system 750 is arranged to monitor the change in battery power consumption to the user equipment 100.

In some embodiments, the user equipment 100 comprises a local service 760 such as e.g. an MP3 player, a digital camera, a radio, a word processor, an advanced calculator, an offline game, etc.

Figure 8:
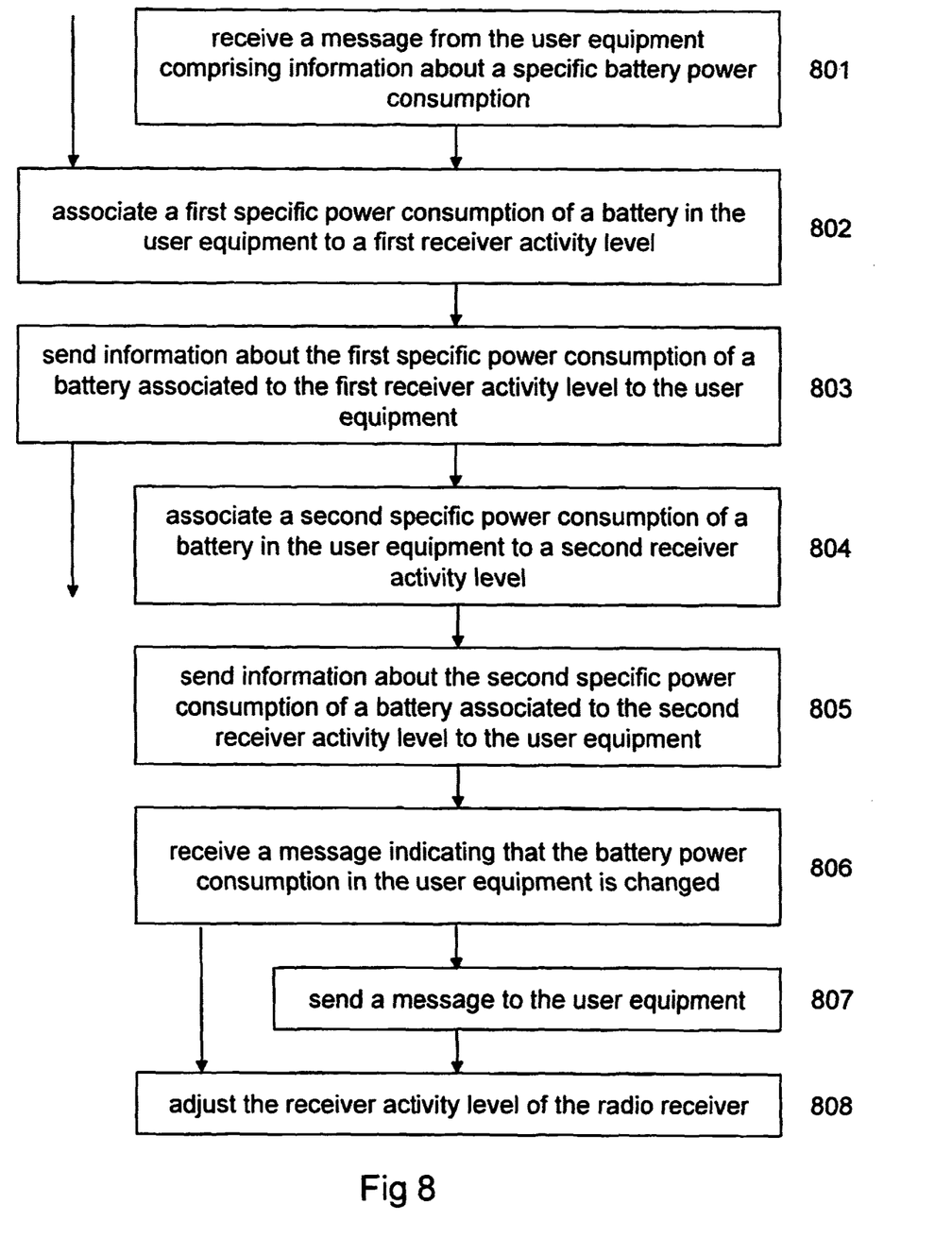
FIG. 8 is a flowchart illustrating embodiments of method steps in a network node.

The method steps in the network node 130 for handling a radio receiver 710 comprised in the user equipment 100 will now be described with reference to a flow chart depicted in FIG. 8. The method comprises the following steps:

801. According to some embodiments, the network node 130 may in this step receive a message from the user equipment 100. The message comprises information about a first specific battery power consumption of the user equipment 100.

802. In this step the network node 130 associates a first specific power consumption of a battery in the user equipment 100, to a first receiver activity level.

803. In this step the network node 130 sends information about the first specific power consumption associated to the first receiver activity level to the user equipment 100.

The information sent in this step may comprise an instruction for the user equipment 100 to use the first receiver activity level.

804. According to some embodiments the network node 130 may associate a second specific power consumption of the battery in the user equipment 100 to a second receiver activity level.

805. In some embodiments, wherein step 804 has been performed, the network node 130 sends the information about the second specific power consumption of a battery associated to the second receiver activity level to the user equipment 100.

806. In some embodiments, wherein step 805 has been performed, the network node 130 may receive a message indicating that the battery power consumption in the user equipment 100 is changed from the first specific battery power consumption to the second specific battery power consumption.

The message may further comprise a request to change from the first activity level of the radio receiver 710 to the second activity level of the radio receiver 710.

In some embodiments, wherein the user equipment 100 uses a service in a second network 140, said message may in this step be received from the second network 140.

807. In some embodiments, wherein a request has been received in step 806, the network node 130 may send a message to the user equipment 100.

The message may comprise an instruction to use the second receiver activity level associated to the second specific battery power consumption.

In some embodiment the message may comprise a rejection of said request.

808. The network node 130 may adjust from the first receiver activity level associated with the first specific battery power consumption to the second receiver activity level associated with the second specific battery power consumption.

Figure 9:
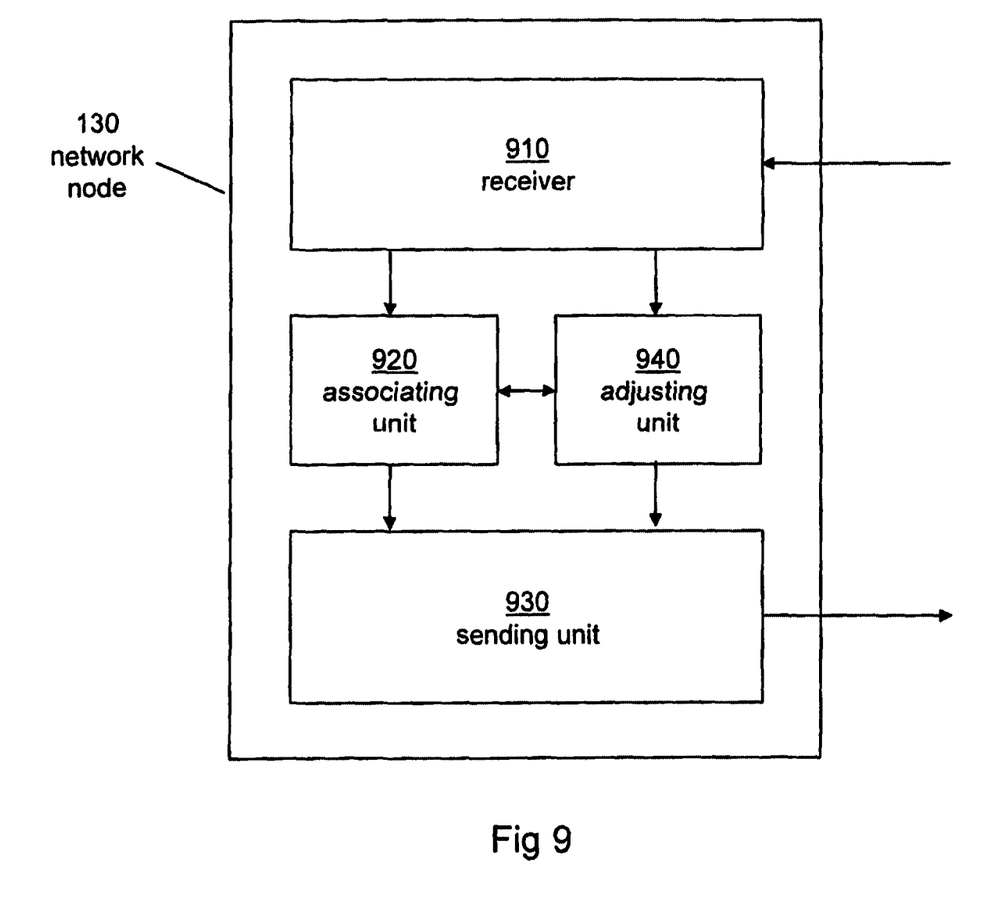
FIG. 9 is a block diagram illustrating embodiments of a network node.

The network node 130 arranged to perform the method steps of handling a radio receiver 710 in a user equipment 100 will now be described with reference to FIG. 9.

The network node 130 comprises a receiver 910 arranged to receive a message.

In some embodiments the receiver 910 may be adapted to receive a message from the user equipment 100 comprising information about a specific battery power consumption of the user equipment 100.

In some embodiments the receiver 910 is adapted to receive a message from the user equipment 100, the message comprising information that the battery power consumption in the user equipment 100 is changed from a first specific battery power consumption to a second specific battery power consumption.

In some embodiments of the invention, wherein the user equipment 100 uses a service in a second network 140, the receiver 910 may be adapted to receive a message from a second network 140, the message comprising information that a battery power consumption in the user equipment 100 is using the second specific battery power consumption.

The network 130 node further comprises an associating unit 920 arranged to associate a first specific power consumption of a battery in the user equipment 100 to a first receiver activity level.

According to some embodiments the associating unit 920 further is arranged to associate a second specific power consumption of a battery in the user equipment 100 to a second receiver activity level.

The network node 130 further comprises a sending unit 930 arranged to send information about a first specific power consumption of a battery associated to a first receiver activity level to the user equipment 100.

According to some embodiments, the information sent by the sending unit 930 may further comprise an instruction to use the first receiver activity level.

The sending unit 930 may further be adapted to send information about a second specific power consumption of a battery associated to a second receiver activity level to the user equipment 100.

The network node 130 may further comprises an adjustor 940 arranged to adjust from the first receiver activity level to the second receiver activity level.

When using the word "comprise" or "comprising" it shall be interpreted as non-limiting, in the meaning of "consist at least of".

The present invention is not limited to the above described embodiments. Various alternatives, modifications, and equivalents may be used. Therefore, the above embodiments should not be taken as limiting the scope of the invention, which is defined by the appending claims.

The invention claimed is:

1. A method in a user equipment for handling a radio receiver in the user equipment, the radio receiver being adapted to receive signals from a first network over a radio link and the user equipment having a battery, the method comprising:
   detecting an increase of battery power consumption in the user equipment;
   increasing an activity level of the receiver based on said detected increase of battery power consumption, wherein adjusting the activity level results in a decrease of a discontinuous reception (DRX) cycle length.

2. The method of claim 1, wherein the increase of the battery power consumption is detected when the increase of the battery power consumption exceeds a predetermined threshold value.

3. The method of claim 1, wherein the user equipment is arranged to use a local service, and detecting the increase of the battery power consumption is represented by detecting a change in activity of the local service.

4. The method of claim 1, wherein the user equipment is connected to a second network, the user equipment uses at least one online service provided by the second network, and detecting the increase of the battery power consumption is represented by detecting a change in use of the at least one online service.

5. The method of claim 1, wherein the battery power consumption in the user equipment is monitored in the user equipment by an operating system of the user equipment.

6. The method of claim 1, wherein the activity level is represented by the discontinuous reception (DRX) cycle length assigned by a network node in the first network, and the method further comprises:
   sending to the network node a message, comprising information indicating the increase of the battery power consumption; and
   receiving an adjusted DRX cycle length from the network node based on the information, and adjusting the activity level based on the adjusted DRX cycle length.

7. The method of claim 6, wherein the message further comprises a suggested DRX cycle length determined by the user equipment.

8. The method of claim 6, wherein sending the message to the network node includes awaiting an uplink transmission.

9. The method of claim 1, wherein the activity level is represented by the discontinuous reception (DRX) cycle length, and the method further comprises:
   receiving at least two pre-configured DRX cycle lengths from a network node before detecting the increase, the at least two pre-configured DRX cycle lengths including a first pre-configured DRX cycle length and a second pre-configured DRX cycle length; and
   sending to the network node a first message, comprising information indicating the increase of the battery power consumption.

10. The method of claim 9, further comprising adjusting the activity level by switching to one of the at least two pre-configured DRX cycle lengths.

11. The method of claim 9, wherein the first message further comprises a request to switch from a first DRX cycle length to a second DRX cycle length, and the method further comprises receiving from the network node a second message, comprising a rejection of the request.

12. The method of claim 9, wherein the first message further comprises a request to switch from the first DRX cycle length to the second DRX cycle length, and the method further comprises, before adjusting the activity level, receiving an accept message from the network node, the accept message comprising an instruction to switch from the first pre-configured DRX cycle length to the second pre-configured DRX cycle length.

13. A method in a network node for handling a radio receiver in a user equipment, the network node and the user equipment configured for inclusion in a wireless communication network, the method comprising:
   associating a first power consumption from a battery in the user equipment to a first receiver activity level,
   associating an increased second power consumption from the battery in the user equipment to an increased second receiver activity level,
   sending information about the first power consumption associated to the first receiver activity level to the user equipment, and
   sending information about the increased second power consumption associated to the increased second receiver activity level to the user equipment, wherein the increased second receiver activity level results in a decrease of a discontinuous reception (DRX) cycle length.

14. The method of claim 13, further comprising receiving a message from the user equipment, wherein the message comprises information indicating that a battery power consumption in the user equipment changed from the first battery power consumption to the increased second battery power consumption.

15. The method of claim 14, further comprising adjusting to the increased second receiver activity level associated to the increased second battery power consumption.

16. The method of claim 15, wherein the message further comprises a request to change a receiver activity level from the first receiver activity level to the increased second receiver activity level, and the method further comprises, before adjusting, sending a rejection of the request to the user equipment.

17. The method of claim 15, wherein the message further comprises a request to change a receiver activity level from the first receiver activity level to the increased second receiver activity level, and the method further comprises, before adjusting, instructing the user equipment to use the increased second receiver activity level associated to the increased second battery power consumption.

18. A user equipment, comprising:
   a radio receiver adapted to receive signals from a network node of a first network over a radio link;
   a detector arranged to detect an increase of power consumption from a battery in the user equipment; and
   an adjustor arranged to increase an activity level of the radio receiver based on a detected increase of the power consumption, wherein adjusting the activity level results in a decrease of a discontinuous reception (DRX) cycle length.

19. The user equipment of claim 18, wherein the activity level is represented by the discontinuous reception (DRX) cycle length assigned by the network node; the user equipment further comprises a transmitter arranged to send a first message to the network node, the first message comprising information indicating the increase of power consumption; the radio receiver is further adapted to receive an adjusted DRX cycle length from the network node based on the information; and the adjustor is further arranged to adjust the activity level based on the adjusted DRX cycle length.

20. The user equipment of claim 19, wherein the activity level is represented by a DRX cycle length; and the radio receiver is further adapted to receive at least two pre-configured DRX cycle lengths, comprising a first pre-configured DRX cycle length and a second pre-configured DRX cycle length.

21. The user equipment of claim 20, wherein the adjustor is arranged to adjust the activity level by switching to one of the at least two pre-configured DRX cycle lengths.

22. The user equipment of claim 20, wherein the first message further comprises a request to switch from the first pre-configured DRX cycle length to the second pre-configured DRX cycle length; and the radio receiver is arranged to receive a second message from the network node, the second message comprising a rejection of the request.

23. The user equipment of claim 20, wherein the first message further comprises a request to switch from the first pre-configured DRX cycle length to the second pre-configured DRX cycle length; and the radio receiver is arranged to receive an accept message from the network node, the accept message comprising an instruction to switch from the first pre-configured DRX cycle length to the second pre-configured DRX cycle length.

24. A network node arranged to handle a radio receiver in a user equipment, the network node and user equipment being configured for inclusion in a wireless communication network, the network node comprising:
   an associating circuit configured to associate a first power consumption from a battery in the user equipment to a first receiver activity level, and to associate an increased second power consumption from the battery in the user equipment to an increased second receiver activity level, wherein the increased second receiver activity level results in a decrease of a discontinuous reception (DRX) cycle length; and
   a sending unit arranged to send information to the user equipment about the first power consumption and to send information to the user equipment about the increased second power consumption.

25. The network node of claim 24, further comprising a receiver arranged to receive a message from the user equipment, the message comprising information indicating a change of battery power consumption in the user equipment from the first battery power consumption to the increased second battery power consumption, and an adjustor arranged to adjust the receiver in the user equipment from the first receiver activity level to the increased second receiver activity level.

26. The network node of claim 24, wherein the user equipment is configured to use a service in a second network, the receiver in the network node is further arranged to receive a message from the second network comprising information that the user equipment is using the increased second battery power consumption, and the sending unit is further arranged to send an instruction to the user equipment to use the increased second receiver activity level associated to the increased second battery power consumption.

27. The method of claim 3, wherein said increased activity level of the radio receiver corresponds to at least one of a decrease of discontinuous reception cycle length and an increase of at least one of downlink measurements, Doppler estimates, cell synchronization or resynchronization, and use of an online service, such that said increased activity level of the radio receiver consumes no substantial additional power from the user equipment's battery.

* * * * *